Figure 7:
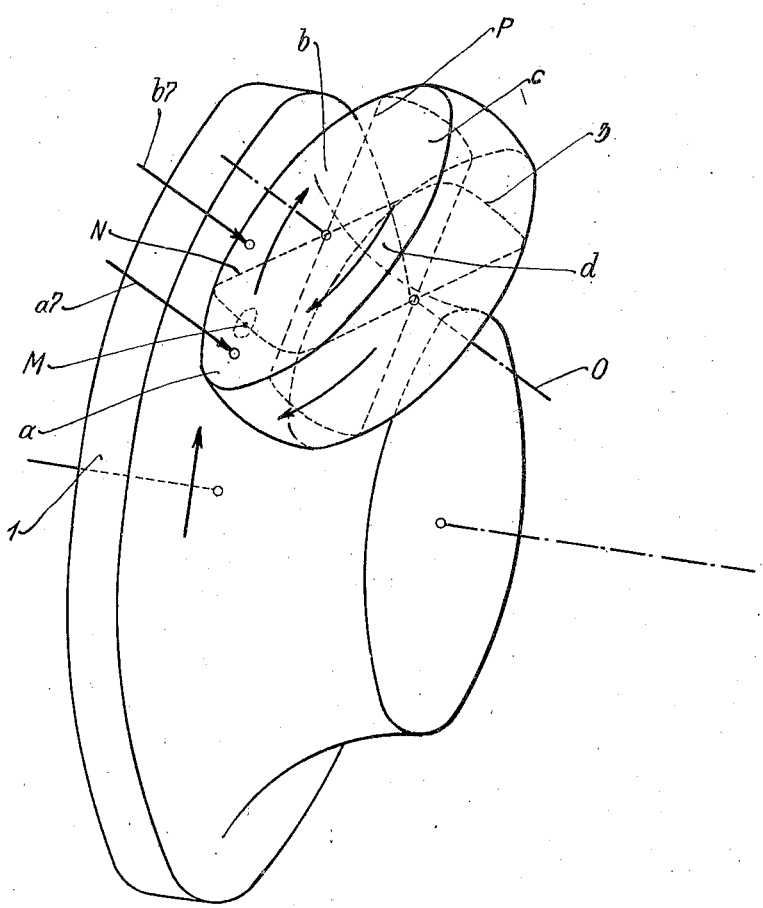

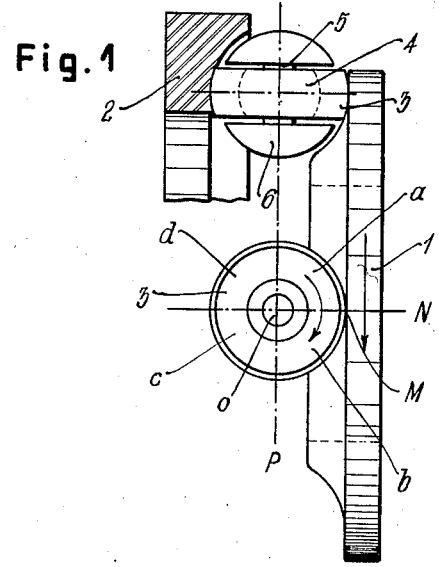

March 8, 1927.  1,619,813
R. ERBAN
SWIVELING ROLLER GEARING
Filed June 26, 1926   2 Sheets-Sheet 2

Patented Mar. 8, 1927.

1,619,813

UNITED STATES PATENT OFFICE

RICHARD ERBAN, OF VIENNA, AUSTRIA.

SWIVELING-ROLLER GEARING.

Application filed June 26, 1926, Serial No. 118,661, and in Austria September 21, 1925.

It has already been proposed in the case of gearings, in which the power is transmitted from a race ring fixed on the driving shaft by means of one or more rollers to race ring fixed on the driven shaft, to vary the gearing ratio by altering the diameters of the circles on which the rollers make contact with the race rings. This is effected by swiveling the rollers about axes which intersect their axes of rotation and are parallel to the tangents at the points of contact between rollers and races. For this purpose the race rings have a toric surface.

As, however, the rollers offer a considerable resistance to being swiveled about such axes parallel to the tangents, it has been proposed to effect the displacement of the roller indirectly by turning the roller about an axis passing through the points of contact of the roller with the race rings, so that the tangents at the roller in the points of contact no longer represent tangents at circles on the race rings, but at spirals. The rollers then move, according to the direction of rotation, in spiral paths outwards or inwards until they are turned back again into a position, in which the tangents of the rollers at the same time represent tangents at circles on the race rings. Where a plurality of rollers is used, however, it is almost impossible to bring all the rollers in this way on to the same circle on the races and to keep them there, as even quite small angles, such as from 2 to 3', between the roller tangent and the running circle tangent suffice for causing the roller to move along a spiral path, a so-called "drawing" of the roller.

For overcoming this drawback the inventor has proposed in his patent application Ser. No. 35,988 to mount the rollers with three degrees of freedom of their rotary motion on spherical bearing members, preferably on spherical ball bearings, and to stabilize them by their gyroscopic action and by means of the spherical ball bearing. Such a manner of mounting is readily adjustable and is not adversely affected by angular inexactness, if not too great, so that the phenomenon of "drawing" is not to be feared. When the rollers are displaced very rapidly, however, more particularly when the load is small, the stabilization of the rollers is not always sufficient for ensuring the rollers being moved with certainty into the new direction of motion.

The object of the present invention is to provide tilting and displacing means, for enabling the rollers to be displaced rapidly at any desired rate of speed, quite independently of the load on the gearing. This device guides the roller which is so mounted as to have three degrees of freedom of rotary motion in a similar manner for instance as the belt fork guides the belt. As experiments have shown, there is actually a certain similarity between the behavior of a roller running on race rings and that of a belt; at each point of contact and "approaching" and "receding" part of the roller may be differentiated and, exactly as it is very easy to displace a belt by acting with a fork on its approaching stretch and almost impossible to do so by acting on the receding stretch, the roller very readily follows a fork acting on its approaching part, while it is impossible to displace the roller by acting on the receding part. Thus, according to the invention each roller is provided with a guiding device which acts in the manner of a guiding fork on the roller, guides it into the desired path and keeps it there.

In the accompanying drawing several constructional examples of the invention are shown. Figure 1 is a longitudinal section and Figure 2 a transverse section through a diagrammatic representation of the arrangement. Figures 3 and 4 are an elevation and a plan view respectively of a constructional form for a definite direction of rotation. Figures 5 and 6 show a constructional form suitable for both directions of rotation in elevation and in plan. Figure 7 shows a roller and a race ring in axonometric view. The other race ring is not shown, similarly to Figure 2 for the sake of clearness. For the same reason the races are not shown at all in Figs. 3 to 6.

In Figures 1 and 2 of the drawing 1 is the inner race ring, 2 the outer race ring and 3 the rollers which are rotatable about the spherical journals 4 of the axles 5. The latter are journalled in segment-shaped pieces 6, which are themselves guided in a known manner in radial slots in a cage which is not shown. In Figures 1 and 7, the two straight lines which are perpendicular to one another are drawn through the centre O of the upper side of the roller, one of which straight lines P is parallel to the tangent on the race 1 in the point of contact M, and the other N parallel to the perpendicular on the running surface in the point M. These straight lines P and N are to be supposed as dividing the roller into four quadrnats $a$, $b$, $c$ and $d$. For the direction of rotation indicated by the arrows $a$ and $c$ are approaching and $b$ and $d$ receding parts of the roller.

On external pressure being applied to the approaching part $a$ (or $c$) in the direction of the arrow $c_7$ (Fig. 2) or an internal pressure in the direction of the arrow $a_8$, the roller will follow this pressure very easily and will set itself in the desired direction. It is however impossible to cause the roller to move on to another running circle by exerting a pressure on one of the receding parts $b$ or $d$.

Figure 3 shows a roller with a guiding device in elevation, corresponding to Figure 2. Figure 4 is the corresponding plan view.

It is assumed that the direction of rotation is that shown by the arrow. The roller 3 is journalled by means of the ball bearing 14 having a spherical outer race on the shaft 5 which itself rests in the segments 6—6. With the assumed direction of rotation the part $a$ which is the approaching part on M lies at the back and at the top, while the part $b$ which is the part receding from M lies at the back and at the bottom. The edges of the segments 6 lying opposite the part $a$ are marked $a_{17}$ and $a_{18}$ respectively. The edges $b_{17}$, $b_{18}$, which lie opposite the receding part $b$ are slightly set back, to prevent them touching the roller. Similarly the edges $c_{17}$, $c_{18}$, $d_{17}$, $d_{18}$ lying opposite the parts $c$ and $d$ are set back, as the edges $a_{17}$ and $a_{18}$ are sufficient for providing a guide. On one of the segments 6 is a lug 9 to which a bar 10 is pivoted. By means of this bar the segments 6 are swivelled, the segments leading the roller 3 into its new position, as soon as the edges $a_{17}$ or $a_{18}$ come in contact with it, and keep the roller in this position. The arrangement described is perfectly satisfactory where the direction of rotation always remains that indicated by the arrow, but is not suitable for the reverse direction of rotation, as in that case the edges $a_{17}$, $a_{18}$ would engage the receding part of the roller.

Figures 5 and 6 show an arrangement similar to that of Figures 3 and 4, but suitable for both directions of rotation. In this case all the edges are set back, the surfaces 16 being milled off the segments 6, which are perpendicular to the guiding surfaces. To the surfaces 16 are attached by means of screws 12 the guiding members 11, 11 so as to be capable of rotating easily, the middle portion of the two members being slightly recessed. On the segments 6 being displaced by means of the bar 10, either the part $c_{27}$ or the part $c_{28}$ of one guiding member 11 lying opposite the approaching part $c$ will first come in contact with the roller 3, in which case the roller will immediately follow the pressure; or the edge $d_{27}$ or $d_{28}$ of one of the guiding members 11 will first make contact with the receding part $d$ of the roller, in which case the roller will not follow the pressure, but the guiding member 11 will turn about its pivot 12, until the edge $c_{27}$ or $c_{28}$ comes in contact with the approaching part $c$ of the roller, whereupon the roller will readily follow the motion of the segments 6. It is obvious from the symmetrical arrangement of this device that it will act for both directions of rotation in a similar manner.

What I claim is:

1. A device for displacing swiveling roller gearings comprising in combination two race rings having toric surfaces, a plurality of rollers capable of rolling between the said race rings, means for journalling the said rollers so as to have three degrees of freedom as regards their rotary motion, and guiding means for each roller capable of engaging with the approaching part of the roller, as set forth.

2. A device for displacing swiveling roller gearings comprising in combination two race rings having toric surfaces, a plurality of rollers capable of rolling between the said race rings, means for journalling the said rollers so as to have three degrees of freedom as regards their rotary motion and a guiding fork for each roller which embraces the approaching part of the roller, as set forth.

3. A device for displacing swiveling roller gearings comprising in combination two race rings having toric surfaces, a plurality of rollers capable of rolling between the said race rings, means for journalling the said rollers so as to have three degrees of freedom as regards their rotary motion, a guiding fork for each roller which embraces the approaching part of the roller and guiding members mounted on the guiding fork so as to be rotatable about journals parallel to the plane in which the roller rolls and which are, therefore capable of coming in contact automatically with the part of the roller, which happens to be the approaching part, as set forth.

In testimony whereof I have hereunto set my hand.

RICHARD ERBAN.